(12) United States Patent
Toussaint

(10) Patent No.: US 7,406,769 B1
(45) Date of Patent: Aug. 5, 2008

(54) PIPE CUTTING APPARATUS

(76) Inventor: Richard Toussaint, 36 Gun Club Rd., Northport, NY (US) 11768

( * ) Notice: Subject to any disclaimer, the term of this patent is extended or adjusted under 35 U.S.C. 154(b) by 357 days.

(21) Appl. No.: 10/909,775

(22) Filed: Aug. 2, 2004

(51) Int. Cl.
*B23D 21/08* (2006.01)
(52) U.S. Cl. .................. 30/93; 30/95; 30/97; 30/101
(58) Field of Classification Search .............. 30/93–97, 30/101, 102; 82/70.2, 72, 76, 79, 81, 83, 82/86
See application file for complete search history.

(56) References Cited

U.S. PATENT DOCUMENTS

| 4,305,205 | A |   | 12/1981 | Girala |       |
|-----------|---|---|---------|--------|-------|
| 4,624,052 | A | * | 11/1986 | Garcia et al. | 30/97 |
| 4,802,278 | A |   | 2/1989  | Vanderpol et al. |  |
| 4,953,292 | A |   | 9/1990  | Tobey |       |
| 5,103,699 | A | * | 4/1992  | Brown  | 82/73 |
| 5,243,760 | A |   | 9/1993  | May, Jr. |    |
| 5,528,830 | A | * | 6/1996  | Hansen | 30/97 |
| 5,829,142 | A |   | 11/1998 | Rieser |       |
| 6,095,021 | A |   | 8/2000  | Epperson |     |
| 6,202,307 | B1 |  | 3/2001  | Wrate  |       |
| 6,336,270 | B1 |  | 1/2002  | Dureiko |      |
| 6,481,105 | B1 |  | 11/2002 | Haung  |       |

FOREIGN PATENT DOCUMENTS

| CA | 987485  | 4/1976 |
| CA | 1301422 | 5/1992 |
| GB | 1388477 | 3/1975 |

* cited by examiner

*Primary Examiner*—Boyer D. Ashley
*Assistant Examiner*—Omar Flores Sánchez
(74) *Attorney, Agent, or Firm*—Michael I. Kroll

(57) ABSTRACT

A portable rechargeable apparatus for cutting a pipe with a collar having a throughbore for receiving pipe therein with a blade positioned within the throughbore for cutting the pipe. A gear teeth exteriorly positioned on the housing whereby a drive mechanism having an electric motor driving a gear and spaced apart arms for receiving the collar can rotatively drive the collar for cutting the pipe.

7 Claims, 10 Drawing Sheets

PIPE CUTTING APPARATUS

BACKGROUND OF THE INVENTION

1. Field of the Invention

The present invention relates generally to electrically driven cutting devices and, more specifically, to a cutting device for pipe comprising a collar having a throughbore for receiving pipe therein with a blade positioned within said throughbore for cutting said pipe and exteriorly positioned gear teeth on said housing whereby a drive mechanism having an electric motor driving a gear and spaced apart arms for receiving said collar can rotatively drive said collar cutting said pipe.

Additionally, the present invention provides for a second face of gear teeth on said collar whereby a second driven gear incorporated into the drive mechanism can be used to increase torque to cut said pipe.

2. Description of the Prior Art

There are other cutting devices designed for pipe. Typical of these is U.S. Pat. No. 4,802,278 issued to Vanderpol et al. on Feb. 7, 1989.

Another patent was issued to Tobey on Sep. 4, 1990 as U.S. Pat. No. 4,953,292. Yet another U.S. Pat. No. 4,305,205 was issued to Girala on Dec. 15, 1981 and still yet another was issued on Sep. 14, 1993 to May, Jr. as U.S. Pat. No. 5,243,760.

Another patent was issued to Rieser on Nov. 3, 1998 as U.S. Pat. No. 5,829,142. Yet another U.S. Pat. No. 6,095,021 was issued to Epperson on Aug. 1, 2000. Another was issued to Wrate on Mar. 20, 2001 as U.S. Pat. No. 6,202,307 and still yet another was issued on Jan. 8, 2002 to Dureiko as U.S. Pat. No. 6,336,270.

Another patent was issued to Haung on Nov. 19, 2002 as U.S. Pat. No. 6,481,105. Yet another U.K. Patent No. 1,388,477 was issued to Gibbs et al. on Mar. 26, 1975. Another was issued to Feamster III on Sep. 25, 1974 as Canadian Patent No. 1,301,442 and still yet another was issued on Jan. 4, 1992 to Ross as Canadian Patent No. 1,301,442.

U.S. Pat. No. 4,305,205

Inventor: Anthony S. Girala

Issued: Dec. 15, 1981

A self-clamping cutting tool which includes a handle (11) attached to a C-shaped housing (12) and has an opening (13) sized to admit a pipe (23). Rotatably mounted within the housing is a C-shaped tool body (24) carrying a set of clamping rolls (27, 28 and 31) and two support rolls (51 and 52) and an edged cutting roll (64). The support rolls are disposed to one side of the axis (29) of a pipe and the cutting roll is disposed to the other side of a pipe axis so that these rolls contact a pipe at three circumferential points. Cutter advancing apparatus (63, 65, 66, 67, 68) advance the cutting roll toward the support rollers. The support rolls and cutting roll are rotatable independently of the C-shaped housing. A one way ratchet mechanism (41, 43) disposed between the C-shaped housing and the C-shaped tool body permits operation by movement in one rotational direction about the pipe axis. In another embodiment, the tool body is rotated by a power driven mechanism (80-87). In addition, an automatic cutter advancing device (75-79) can be provided.

U.S. Pat. No. 4,802,278

Inventor: Jerald Vanderpol et al.

Issued: Feb. 7, 1989

A tube cutting tool is described in which a cutting head is rotatably mounted within a cutting body wherein both define "C" shaped slots to enable the cutting tool to be inserted laterally over a tube. A cutting wheel is attached to the cutting head such that rotation of the cutting head causes the wheel to pass around the periphery of the tube. A feed device is incorporated which biases the cutting wheel into contact with the tube until the tubing wall has been completely severed. A gear drive mechanism interconnects a power source with the cutting head to rotate it about the tube. A clamping system is also disclosed to clamp the device onto the tube during the cutting process.

U.S. Pat. No. 4,953,292

Inventor: Billy D. Tobey

Issued: Sep. 4, 1990

A hand-holdable tube cutting device includes a tube clamping unit that opens and closes to hold a tube being cut in position. The clamping unit includes a driven bevel gear that moves in a race. The bevel gear is driven by a driver bevel gear that is connected to a motor. A sanding unit is mounted on the driven bevel gear and a cutting oil dispensing system is included. The entire device can be operated using one hand via a trigger mechanism whereby a plurality of functions can be effected.

U.S. Pat. No. 5,243,760

Inventor: Myron R. May, Jr.

Issued: Sep. 14, 1993

A tube cutting tool is described in which a cutting head is rotatably mounted within a tool body wherein both define "O" shaped openings to enable tubing to be inserted perpendicularly through the tool. A cutting wheel is incorporated into the cutting head such that rotation of the cutting head causes the wheel to pass around the periphery of the tube. A feed cam and lever device are incorporated which mechanically bias the cutting wheel into contact with the tube wall until the tube wall has been completely severed. A gear drive assembly transports power from a power source to the cutting head to rotate it about the tube. Stabilizing devices are utilized to help secure and align the tubing into the cutting tool during operation.

U.S. Pat. No. 5,892,142

Inventor: Timothy John Rieser

Issued: Nov. 3, 1998

A motorized tool allows one or more operations to be performed on a workpiece, such as cutting and/or conditioning a surface of a pipe or a pipe fitting or receptacle. The motorized tool includes a cutter and/or one or more rotatably driven accessories, such as workpiece surface conditioners or brushes. The motorized tool further includes a drive mechanism used to rotate the workpiece against the cutter and to rotate the rotatably driven accessories. In one example, the drive mechanism rotates drive rollers that contact a workpiece and rotates the workpiece against a cutting element or edge of the cutter. In another example, the motorized tool includes an internal workpiece surface conditioner and an external workpiece surface conditioner that are also rotated by the drive mechanism to clean, debur or otherwise condition internal and external workpiece surfaces. The motorized tool can be hand-held or hand-operated and includes opposing pivotable members having handle portions. The cutter is disposed on one of the opposing members and the drive rollers are disposed on the other of the opposing members such that the workpiece is positioned between the opposing members in engagement with the drive rollers and cutting edge.

U.S. Pat. No. 6,095,021

Inventor: Kenneth Epperson

Issued: Aug. 1, 2000

A hub assembly includes a sector gear with teeth that extend over a segment of a gear circle. The sector gear has a lip along an interior circle within the gear circle and concentric therewith. The sector gear is bracketed by a pair of sector plates that have the general shape of a portion of a hollow cylinder. The lip and the plates are substantially a portion of a hollow cylinder with an inside that is a boundary of the interior of the hub assembly. A spring urges a pair of rotatable bearings into contact with a pipe that is within the hub assembly. A spring urges the blade into contact with the pipe the pipe. A motor causes a rotation of the hub assembly about the pipe, thereby cutting the pipe.

U.S. Pat. No. 6,202,307

Inventor: Leonard A. Wrate

Issued: Mar. 20, 2001

A motor driven, hand-held tubing cutter is disclosed, which can be held stationary by a worker while cutting the tubing, and does not require that the tubing be held in a vise or other clamping tool. The device is reversible, and upon completion of the cut, the device can be reset automatically to its initial position to receive a subsequent length of tubing for cutting. The tool has a motor-rotated cutting head into which the tubing to be cut is inserted, one or more cutting blades which are urged into cutting contact with the tubing wall by the motor-driven rotation of the head in cooperation with indexing bosses, and, once the tubing is cut through, reversal of the driving motors causes the blades to be retracted into the head, resetting the tool for further cutting. The tool may be used to cut any cuttable metal or plastic tubings, including tubing of aluminum, brass, copper, steel, ABS, PVC, polycarbonate, phenolic, etc.

U.S. Pat. No. 6,336,270

Inventor: Dan R. Dureiko

Issued: Jan. 8, 2002

A portable battery operated tube electrical conduit processing tool is disclosed. The tool has a housing includes a body portion and a handle portion connected in transverse relationship. A battery is connected to the handle portion. A motor is carried by the body portion and a switch controlled circuit connects the battery to the motor. The body portion delineates a work station with a station access opening. A motor driven workpiece drive is mounted adjacent the station. A gear train drivingly interconnects the motor and the drive whereby a workpiece may be drivingly rotated on actuation of the switch to energize the motor. A cutter support and cutter are movingly carried by the body portion. A manually actuatable trigger mechanism is operably connected to the switch and the support for actuating the switch to energize the motor and for pressing the cutter against a workpiece. The gear train further includes an accessory drive shaft for driving burnishing brushes and a disclosed novel reamer.

U.S. Pat. No. 6,481,105

Inventor: Tom Haung

Issued: Nov. 19, 2002

A pipe cutter includes a handle, a power-forcing handle, a position recovery member, a drive device, a revolving member, and a cutter device combined together. The handle and the power-forcing handle are pivotally combined together, and pressing the power-forcing handle toward the handle to force the drive device to revolve the revolving member and the cutter device to cut off a pipe placed in the revolving member. The pipe cutter is easy to handle by only pressing the power-forcing handle in cutting a pipe.

U.K. Patent Number 1,388,477

Inventor: James W. Gibbs et al.

Issued: Mar. 26, 1975

The invention relates to pipe and rod cutting apparatus generally and relates particularly to heavy duty production type pipe cutting means having self-centering clamping chuck means and self-centering power operative pipe-cutting blade elements.

Canadian Patent Number 987485

Inventor: William C. Feamster, III

Issued: Sep. 25, 1974

A pipe cutting and end preparing device for use in severely confined quarters, wherein a collet, cam washer and collet nut, each of semi-circular segments, are adapted to be disposed about a pipe within a collar formed of semi-circular segments, which in turn rotatably supports a tool carriage ring and ring gear concentric with the pipe axis. A support framework of hinged together members surrounds the collar in assembled condition. A tool carrier is advanced periodically upon rotation of the carriage ring. Removable locking or holding pin paralleling the pipe axis hold the various segments in properly assembled relation.

Canadian Patent Number 1,301,442

Inventor: Dominique Ross

Issued: May 26, 1992

A hand-held electric pipe cutter comprising:

a) a body having a handle portion and a head portion;

b) an electric motor mounted in said head portion;

c) a rotatable C-shaped pipe receiving and cutting jaw mounted in said head portion and operatively connected to said motor; said jaw defining a lateral opening for receiving a pipe to be cut; and d) rotational drive transmission means mounted in said head portion between said motor and said jaw for rotating said jaw; said jaw consisting of i) first cylindrical housing means including first gear means engageable with said drive transmission means, said first cylindrical housing means defining a cam surface thereon;

ii) second cylindrical housing means including second gear means engagable with said drive transmission means and said cutting means adapted to engage the outer surface of a pipe when received in said jaw; said second cylindrical housing means including a cam following means adapted to ride on said cam surface of said first housing means; the gear ratio of said first and second gear means on said first and second housing means being predetermined to provide said first housing means with one full rotation in addition to the predetermined number of rotations of said second housing means whereby said cutting means progressively penetrate and cut into said pipe to be cut as both said first and second housing means are rotated by said motor.

While these cutting devices may be suitable for the purposes for which they were designed, they would not be as suitable for the purposes of the present invention, as hereinafter described.

SUMMARY OF THE PRESENT INVENTION

A primary object of the present invention is to provide a pipe cutting apparatus having a collar with a cutting blade and electric motor for driving said collar.

Another object of the present invention is to provide a pipe cutting apparatus that can be used in confined spaces.

Yet another object of the present invention is to provide a collar comprising a housing with a rotatable cutting blade therein with exteriorly positioned gear teeth thereon.

Still yet another object of the present invention is to provide a drive mechanism comprising a housing having an electric motor driving a gear.

Another object of the present invention is to provide said drive mechanism housing with spaced apart arms for receiving said collar housing.

Yet another object of the present invention is to provide a drive mechanism wherein said electrically driven gear engages the exterior collar housing gear teeth.

Still yet another object of the present invention is to provide a drive mechanism wherein said driven gear can be a pair of spaced apart gears.

Additional objects of the present invention will appear as the description proceeds.

The present invention overcomes the shortcomings of the prior art by providing a cutting device for pipe comprising a collar having a throughbore for receiving pipe therein with a blade positioned within said throughbore for cutting said pipe and exteriorly positioned gear teeth on said housing whereby a drive mechanism having an electric motor driving a gear and spaced apart arms for receiving said collar can rotatively drive said collar cutting said pipe.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
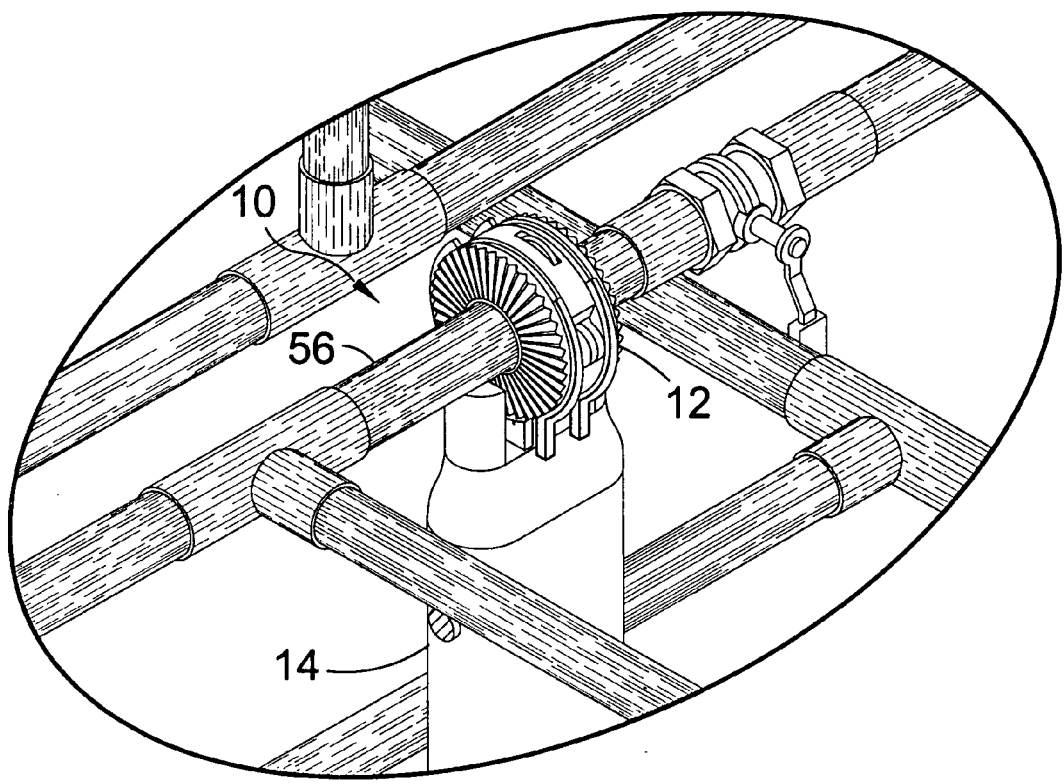
FIG. 1 is an illustrative view of the present invention in use.

Turning now descriptively to the drawings, in which similar reference characters denote similar elements throughout the several views, the figures illustrate the Pipe Cutting Apparatus of the present invention. With regard to the reference numerals used, the following numbering is used throughout the various drawing figures.

10 Pipe Cutting Apparatus
12 cutting head
13 throughbore of 12
14 power pack
15 cutting gear assembly
16 support gear assembly
18 first beveled ring gear of 12
20 first semi-circular section of 18
22 second semi-circular section of 18
24 second beveled ring gear of 12
26 first semi-circular section of 24
28 second semi-circular section of 24
30 supporting jaw of 20
32 cutting jaw of 20
34 supporting jaw of 24
36 cutting jaw of 24
38 cutting wheel 39 cutting wheel axle
40 cutting wheel recess
41 cutting wheel axle leaf spring
42 support roller
44 hinge point of 30
46 hinge point of 32
48 hinge point of 34
50 hinge point of 36
51 hinge tension spring
52 housing of 14
53 connection pin
54 power switch of 14
56 pipe
58 fixed cutting head tong
60 pivoting cutting head tong
62 roller bearing surface of 14
63 drive mechanism
64 battery
66 motor
68 primary driveshaft
70 primary bevel gear connection
72 primary pinion gear
74 bevel connection shaft
76 secondary bevel gear connection
78 secondary driveshaft
80 secondary pinion gear
82 coil springs

DETAILED DESCRIPTION OF THE PREFERRED EMBODIMENT

The following discussion describes in detail one embodiment of the invention (and variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 provides a portable, rechargeable pipe-cutting apparatus 10 for cutting pipe 56. The pipe-cutting apparatus 10 may be used to cut pipe 56 already installed in a system, as shown in this illustration, or for cutting pipe 56 for a new installation.

Figure 2:
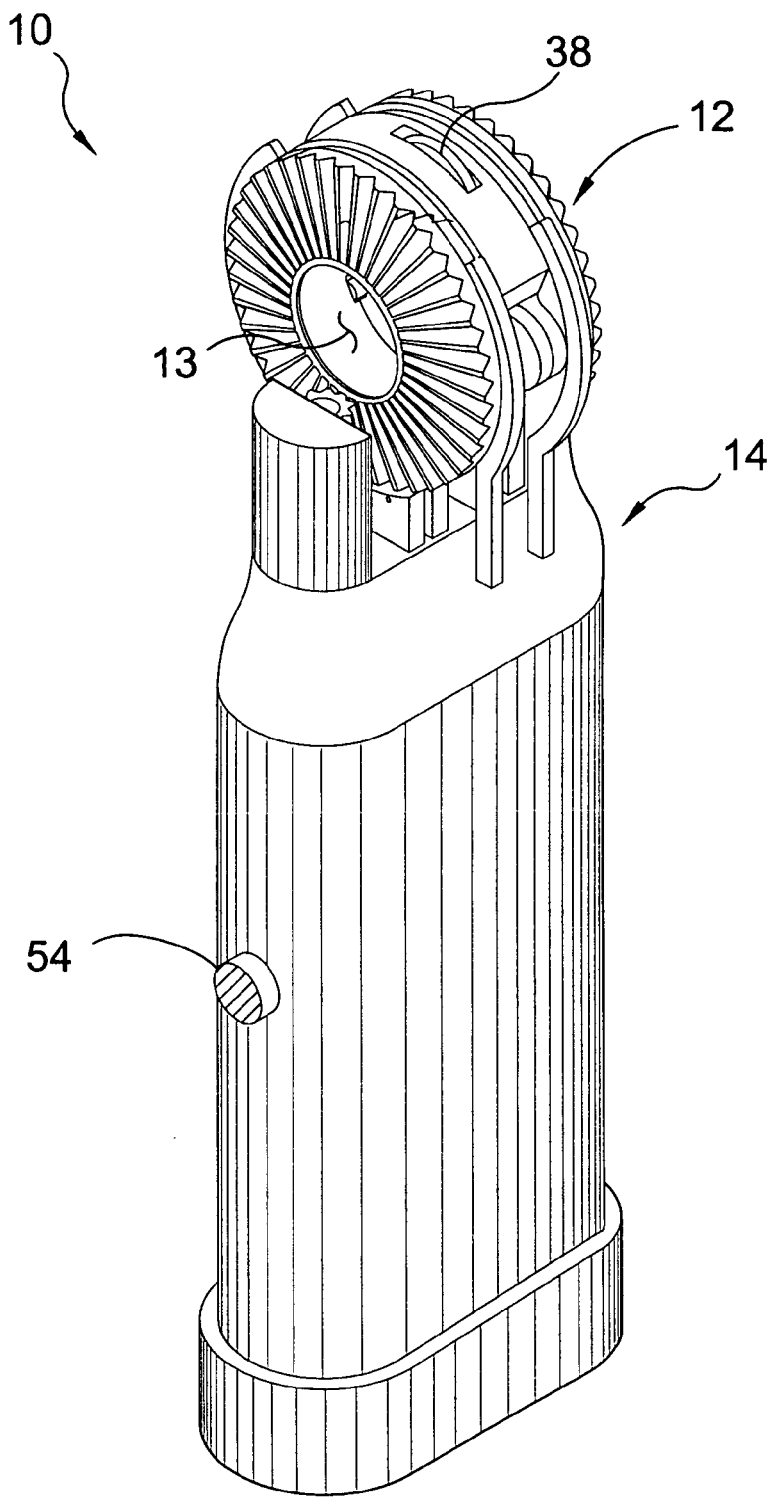
FIG. 2 is an illustrative view of the present invention.

FIG. 2 is an illustrative view of the present invention 10. Shown is the present invention 10 comprising a cutting head 12 and power pack 14 for rotatively driving said cutting head 12. The cutting head 12 comprises a collar having a throughbore 13 with a cutting wheel 38 disposed partially therein. Positioned on the exterior faces of the collar are beveled ring gears 18,24. The power pack 14 has an electrical motor drive with two pinion gears for engaging the beveled ring gears 18,24 although the present invention 10 may be manufactured using a single ring and pinion connection. The power pack 14 also has a power switch 54 to initiate and terminate the operation thereof.

Figure 3:
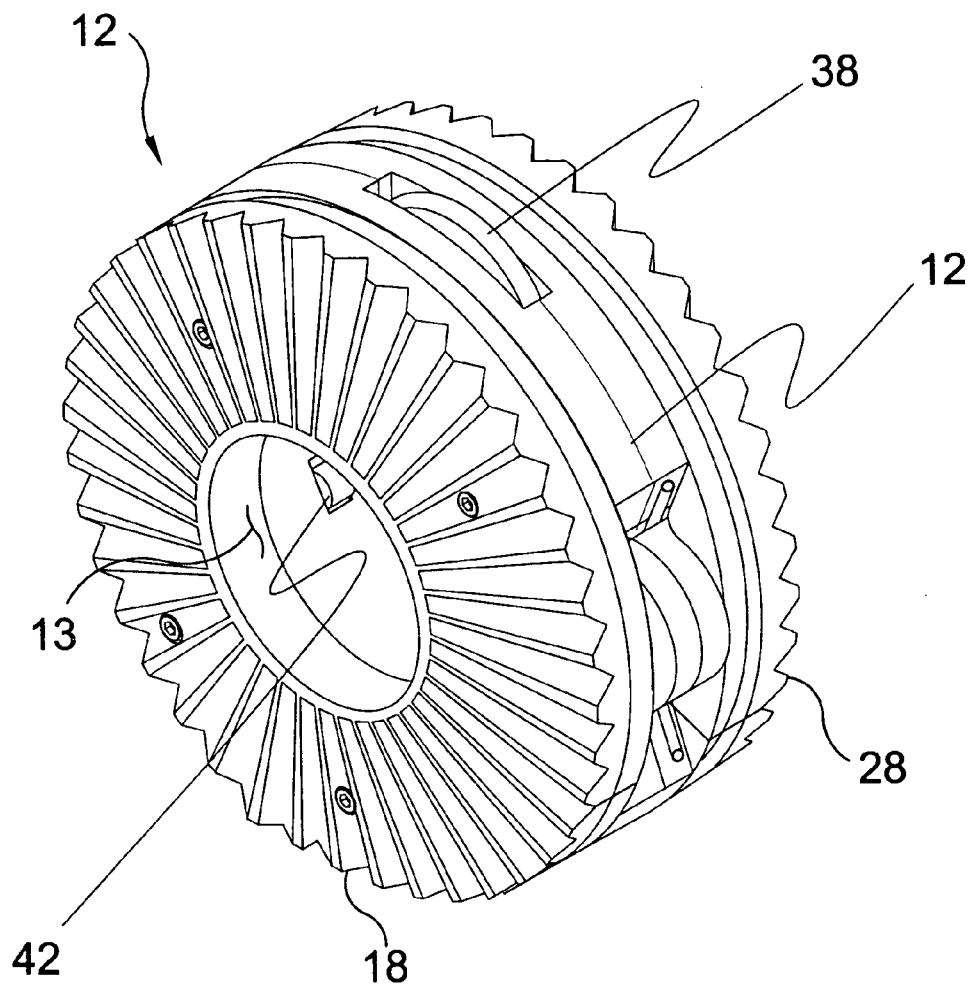
FIG. 3 is an illustrative view of the cutting head.

FIG. 3 is an illustrative view of the cutting head 12. The cutting head 12 is comprised of a collar having a throughbore 13 with a rotative cutting wheel 38 positioned therein. Located on at least one of the exterior faces are a plurality of radially positioned gear teeth that optionally can be on both opposing faces whereby the drive mechanism having an electrical motor driving a gear for engaging the gear teeth of the collar and the drive mechanism also has a pair of spaced apart arms for receiving the collar therein. Shown is a cutting head 12 having two geared faces forming a first beveled ring gear 18 and a second beveled ring gear 24.

Figure 4:
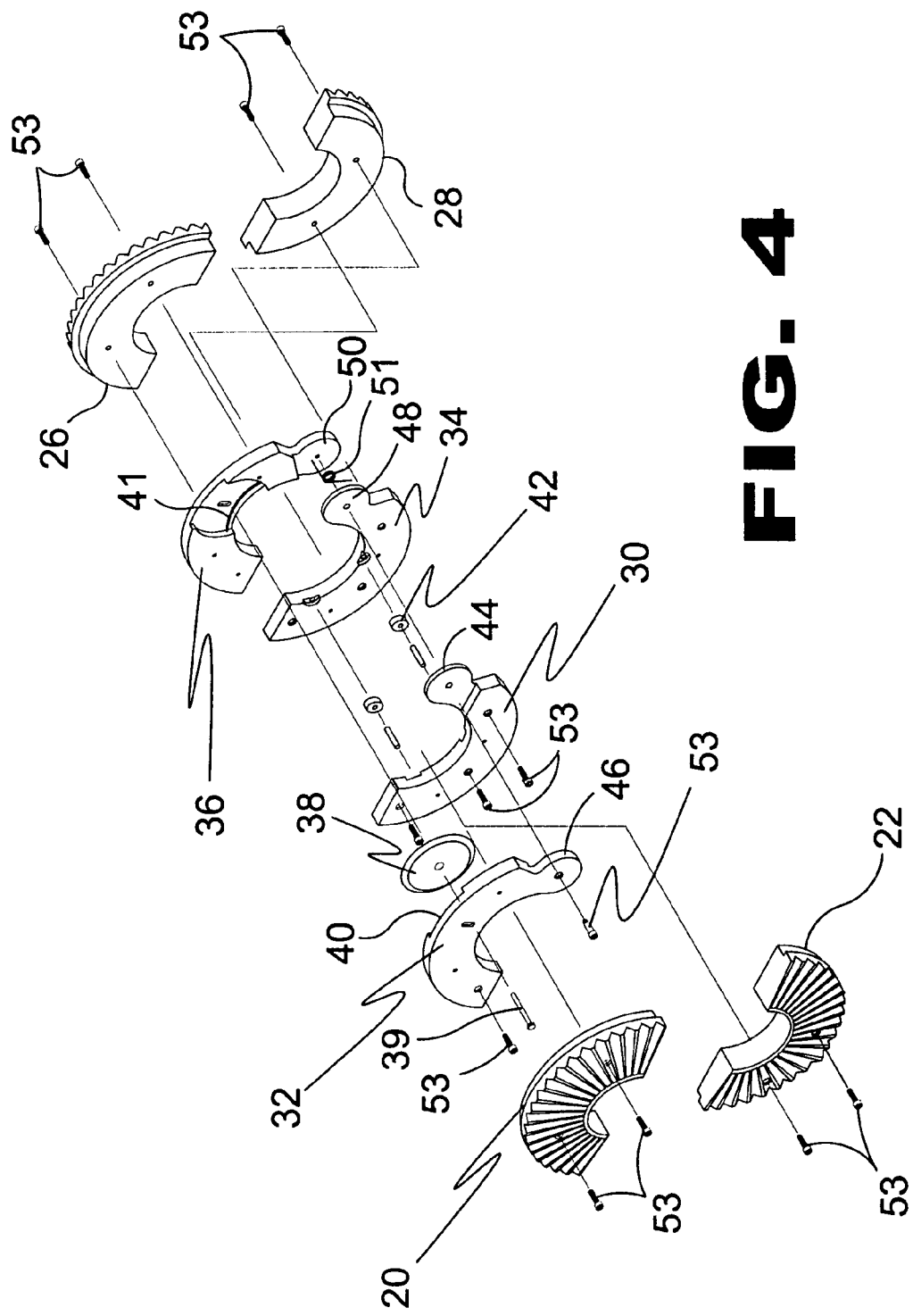
FIG. 4 is an exploded view of the collar comprising the cutting head.

FIG. 4 is an exploded view of the cutting head 12. The cutting head 12 comprises a collar with a first beveled ring gear 18 on one side and optionally a second beveled ring gear 24 on the second side having a central throughbore 13 with a cutting wheel 38 disposed partially therein. The beveled ring gear assemblies 18,24 on the exterior faces of the cutting head 12 have a plurality of radially positioned gear teeth that optionally can be on one or both opposing faces depending on whether a one or two pinion configuration is being used. There is a cutting ring gear assembly 18 pivotally connected to a support ring gear assembly 24. The first semi-circular geared section 20 of the first beveled ring gear 18 is secured to the first cutting jaw 32 with connecting pins 53 and the second semi-circular geared section 22 of the first beveled ring gear 18 is secured to the first supporting jaw 30 with connecting pins 53. The first semi-circular geared section 26 of the second beveled ring gear 24 is secured to the second cutting jaw 36 with connecting pins 53 and the second semi-circular geared section 28 of the second beveled ring gear 24 is secured to the second supporting jaw 34 with connecting pins 53. The first supporting jaw 30 has a hinge point 44 that is pivotally connected to the hinge point 46 of the first cutting jaw 32. The second supporting jaw 34 has a hinge point 48 that is pivotally connected to the hinge point 50 of the second cutting jaw 36. The first cutting jaw 32 is fastened to the second cutting jaw 36 by connection pins 53 and the first supporting jaw 30 is also fastened to the second supporting jaw 34 by connection pins 53. The cutting wheel 38 is rotatively disposed in a cutting wheel recess 40 formed within the first cutting jaw 32 and the second cutting jaw 36 wherein a portion of the cutting wheel extends beyond the interior radius of the cutting jaws 32,36 as do a pair of support roller 42 maintained between the supporting jaws 30,34 that serve to facilitate the rotation of the cutting head 12 around a pipe. A cutting wheel leaf spring 40 provides a downward bias against the cutting wheel axle 39 thereby urging the cutting wheel 38 into the interior cavity and permitting it to retract when a greater bias is applied against the cutting wheel. A hinge tension spring 51 is also provided to maintain the cutting head 12 in the closed position except when an extreme opposing force such as the hands of the user provide a greater counterforce to open the jaws.

Figure 5:
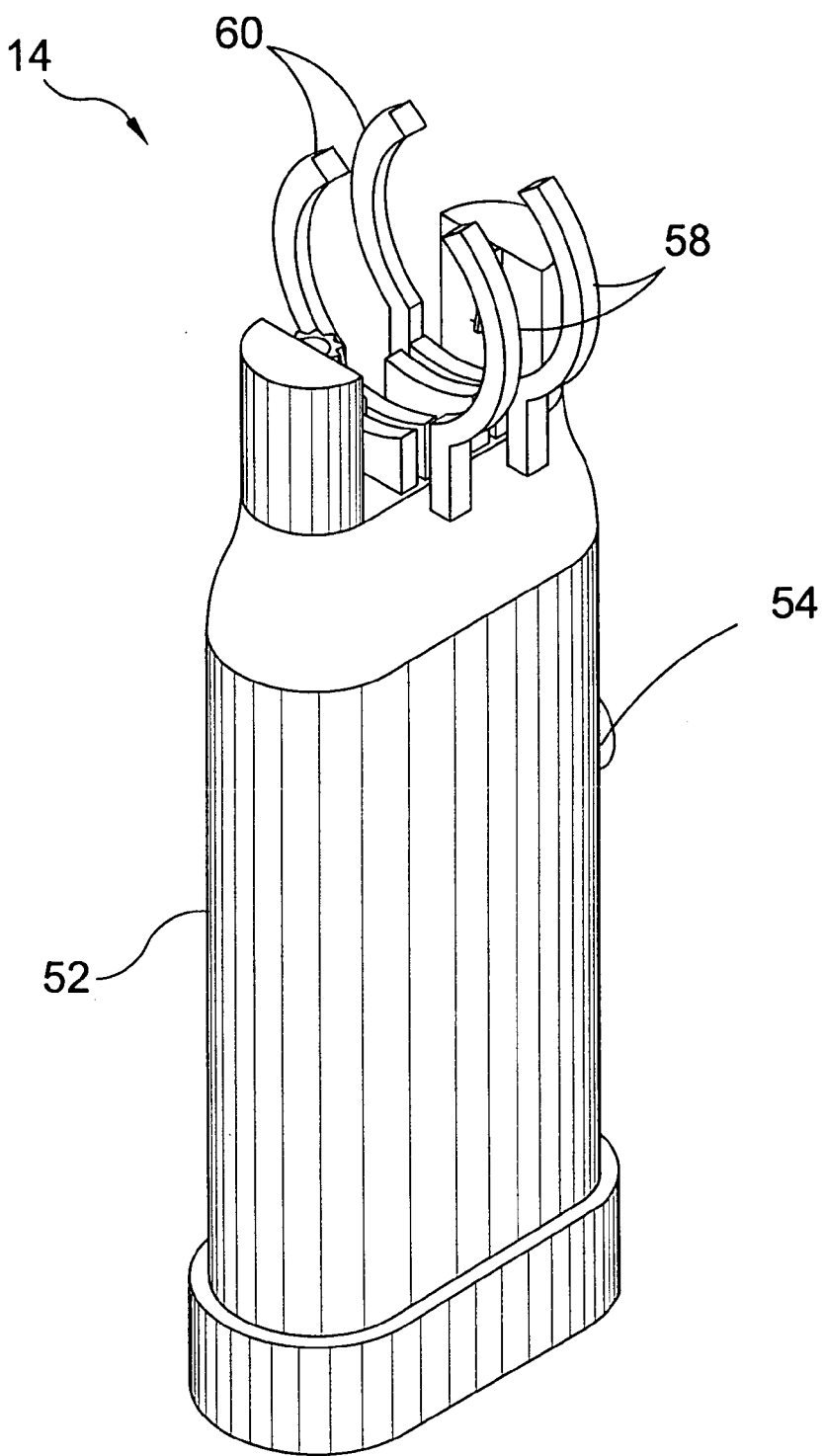
FIG. 5 is an illustrative view of the present invention.

FIG. 5 is an illustrative view of the present invention 10. The power pack 52 provides a means of engaging and driving the cutting head 12. A pair of fixed cutting head tongs 58 and a pair of pivoting cutting head tongs 60 constrain the power pack 52 to the cutting head 12.

Figure 6:
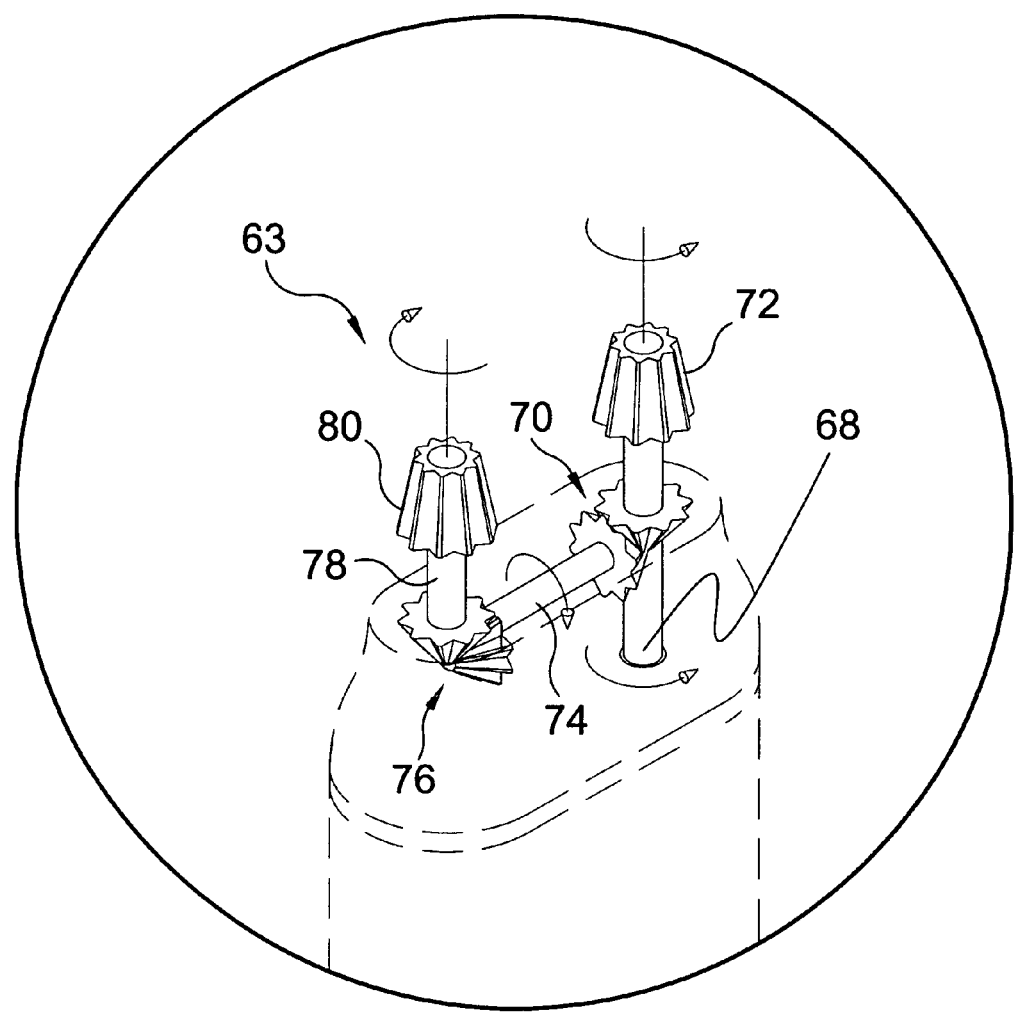
FIG. 6 is an illustrative view of the present invention.

FIG. 6 is an illustrative view of the drive mechanism 63. FIG. 6 illustrates the dual bevel gear drive system 63 in the power pack 52 of the present invention. A system of shafts and bevel gears driven by an electric motor rotate the cutting head 12. The motor turns the primary driveshaft 68 which rotates the primary pinion gear 72 that is to be engaged with second beveled ring gear and also turns the primary bevel gear connection 70 and the secondary bevel gear connection 76 with which it is associated through the bevel connection shaft 74. The secondary bevel gear connection 76 rotates the secondary driveshaft 78 and the secondary pinion gear 80 in the opposite direction of the primary pinion gear 72.

Figure 7:
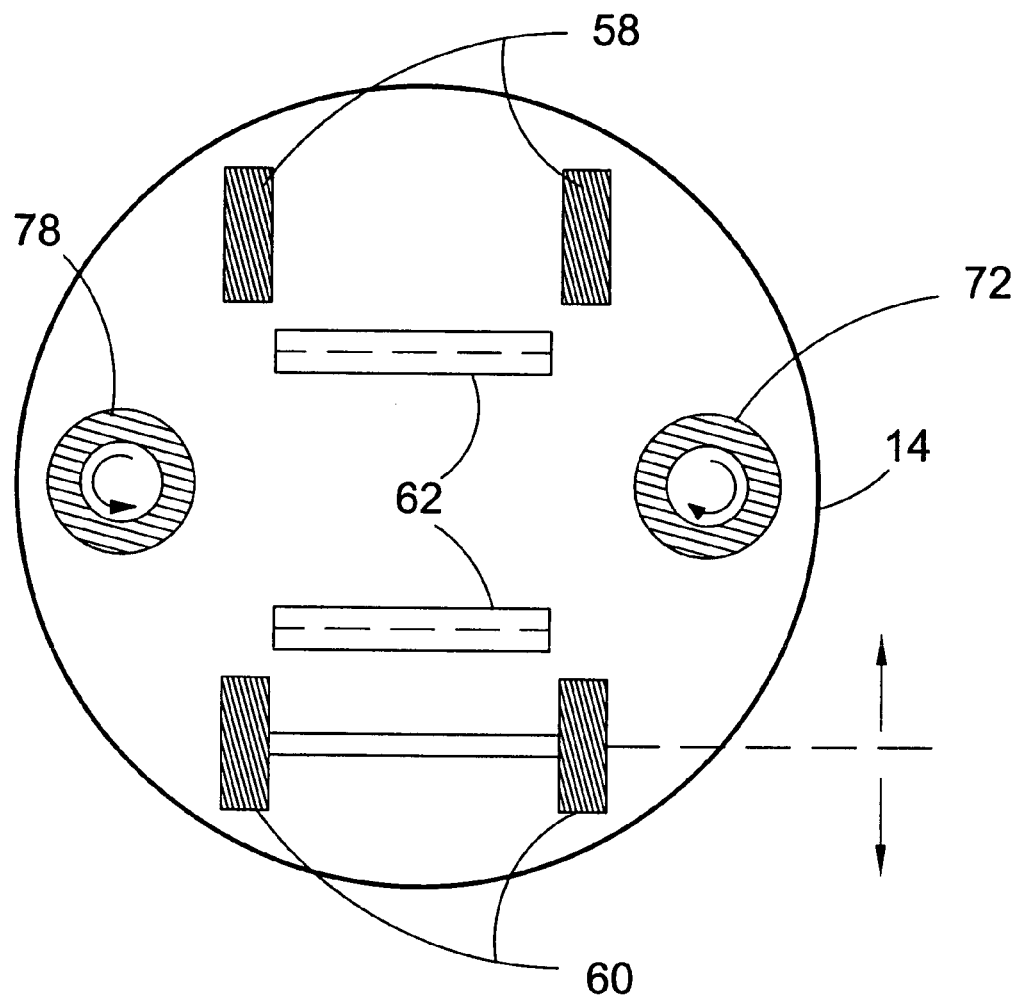
FIG. 7 is an illustrative view of the present invention.

FIG. 7 is an illustrative view of the present invention. Pivoting cutting head tongs 60 are semi-circular elements pivotally attached to the housing 14 while the fixed cutting head tongs 58 remain static with both sets used to constrain the power pack 14 to the cutting head. The mounting members also provide a roller bearing surface 62 for the beveled ring gears. These elements also provide and maintain the geometrical relationship between the beveled pinion and ring gear when operating the device. The primary drive shaft 72 and secondary drive shaft 78 rotate in opposite directions.

Figure 8:
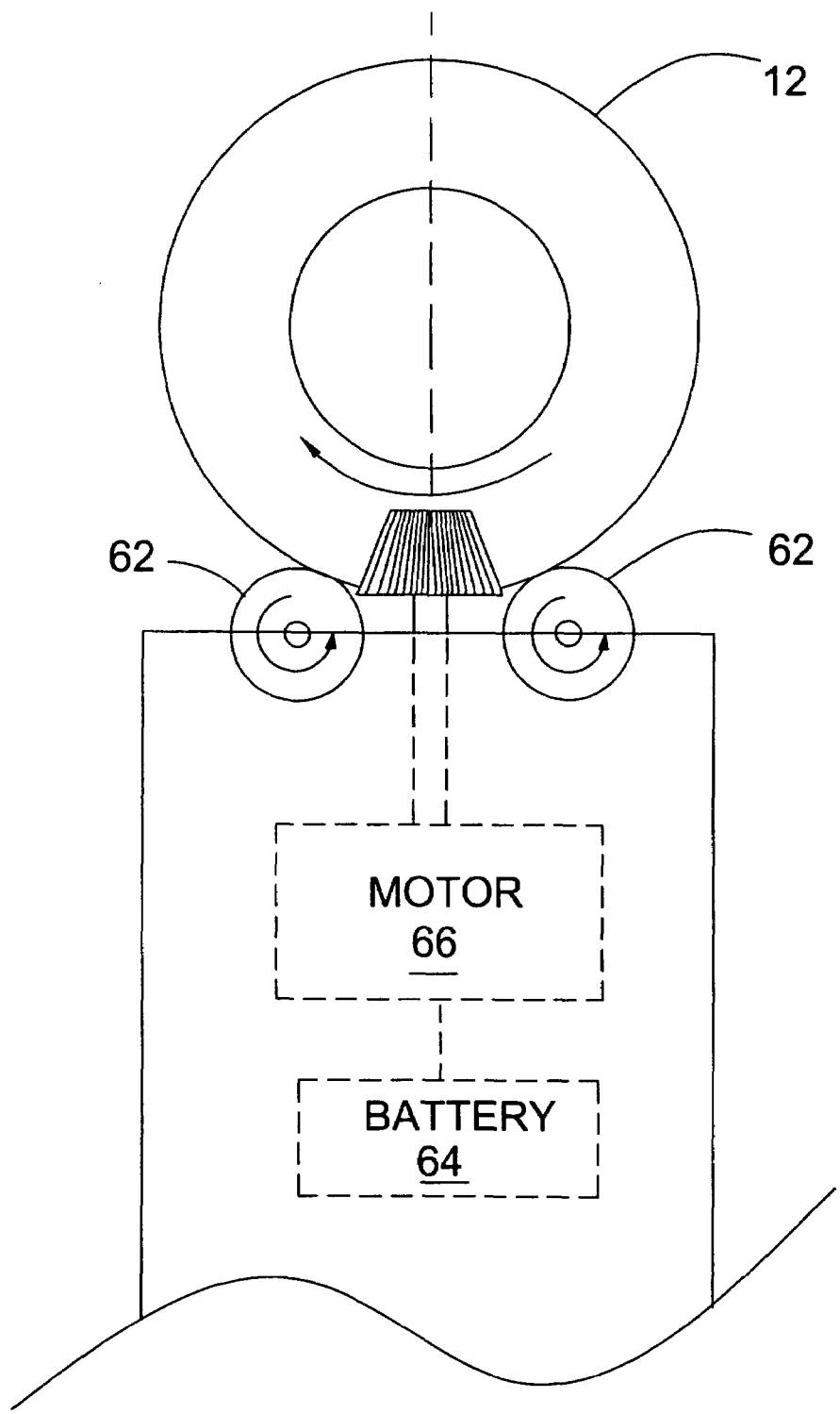
FIG. 8 is an operational view of the cutting head and support rollers.

FIG. 8 is an operational view of the cutting head 12 and support rollers 62. Illustrated is the counterclockwise and clockwise motion of the support rollers 62 and cutting head 12 respectively. A battery 64 powered electric motor 66 within the housing 52 of the power pack 14 drives a pinion gear 72 engaging the cutting head 12.

Figure 9:
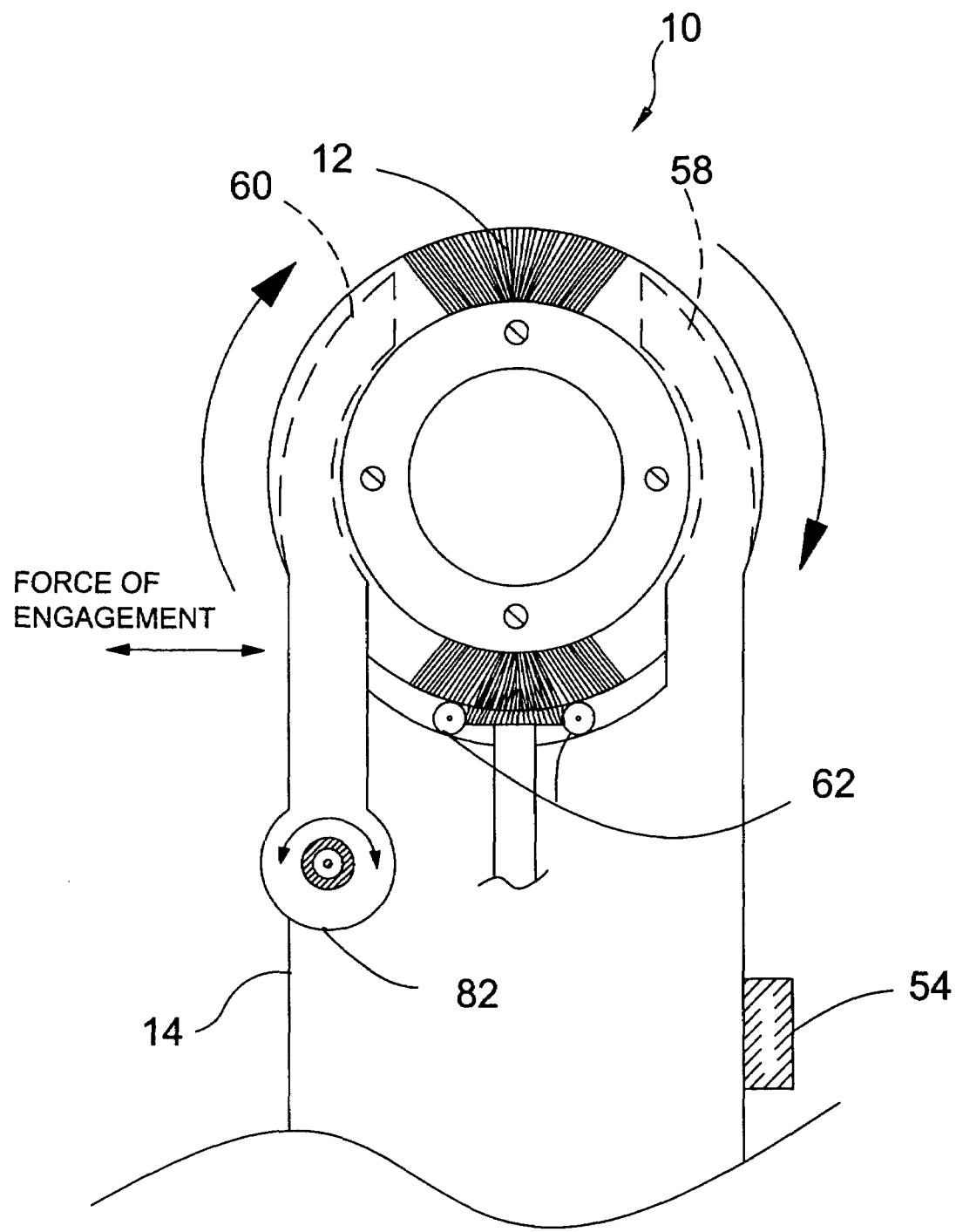
FIG. 9 is a sectional view of the present invention.

FIG. 9 is a sectional view of the present invention 10. Shown is the mechanical action of the fixed cutting head tongs 58 working in conjunction with the pivoting cutting head tongs 60 to retain the cutting head 12 within their grasp due to the bias presented thereagainst by the coil springs 82. When force is applied to the indicated surface of the pivoting tongs 60 they pivot about the shaft in the mounting member. The pivoting tongs 60 continues to pivot until the fully engage the cutting head 12. The power switch 54 on the power pack 14 is also shown.

Figure 10:
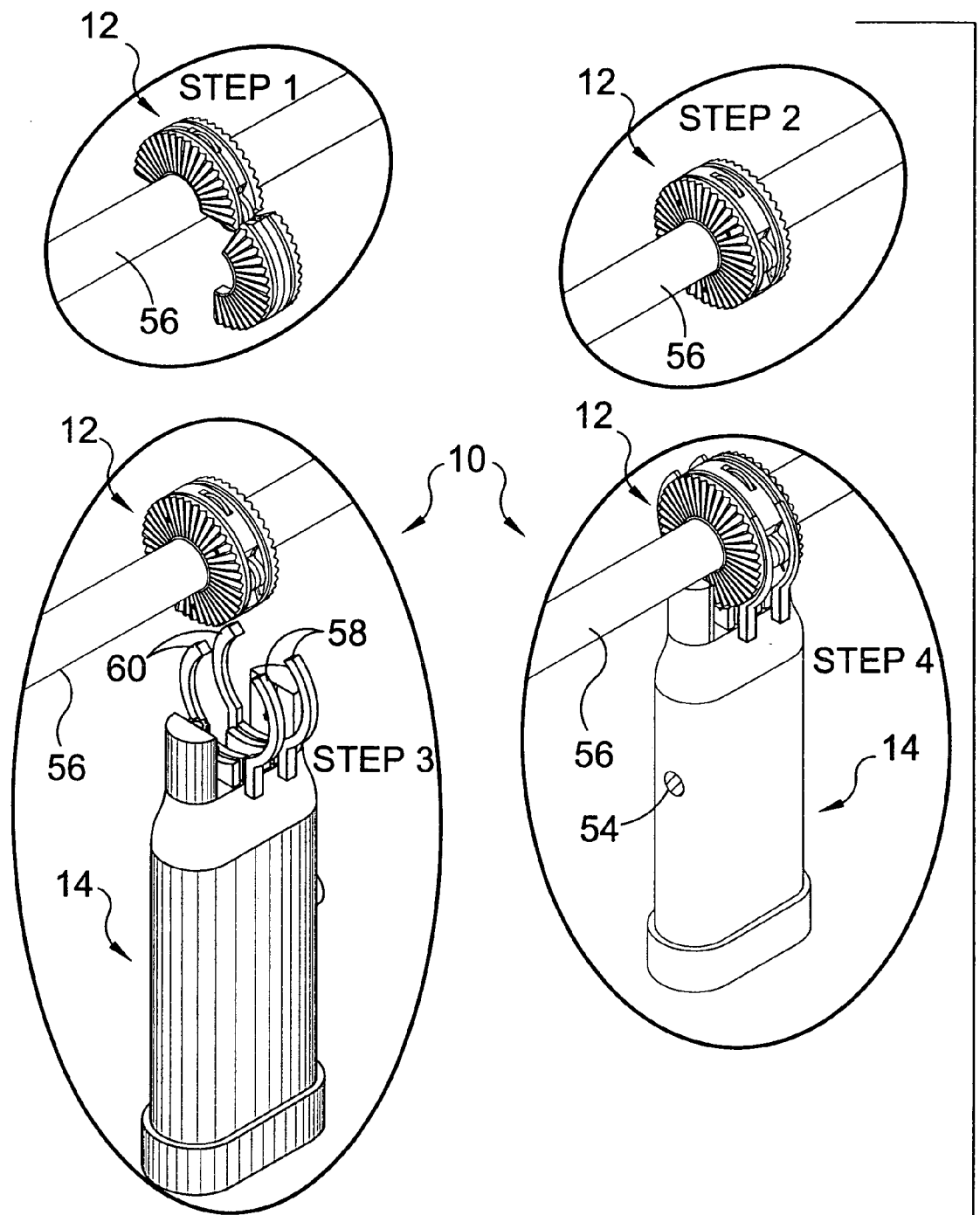
FIG. 10 is an illustrative view of the present invention's operational sequence.

FIG. 10 is an illustrative view of the present invention's 10 operational sequence. Illustrated is the sequence of operation for the present invention. Step 1, the operator locates the cutting head 12 on the pipe 56. Step 2, the cutting head 12 is closed around the pipe 56. Step 3, the user engages the fixed cutting head tongs 58 and the pivoting cutting head tongs 60 of the power pack 14 with the cutting head 12. Step 4, the user engages the power switch 54 and cuts the pipe 56.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An electric pipe-cutting apparatus comprising:
  a) a rotating cutting head comprising:
    a semi-circular beveled cutting ring gear assembly having at least one side geared to form a ring gear to receive a pinion gear to rotatively drive said cutting head and having an interior radius substantially similar to that of a conventional piece of pipe;
    a semi-circular beveled support ring gear assembly having at least one side geared to receive a pinion gear to rotatively drive said cutting head with one end pivotally connected to said cutting ring gear assembly and having an interior radius substantially similar to that of a conventional piece of pipe thereby forming a throughbore sized slightly larger than said pipe when closed against said cutting ring gear assembly; and
    a cutting wheel rotatively disposed between said cutting ring gear assembly and said support ring gear assembly with a portion thereof extending radially into said throughbore;
  b) means for retaining said cutting wheel around the circumference of a pipe;
  c) means for driving said cutting wheel rotatively around said pipe thereby enabling said cutting wheel to circumferentially penetrate and cut said pipe;
  d) said means for driving said cutting wheel is a power pack comprising:
    a substantially columnar housing member;
    a geared drive assembly having at least one pinion gear to be rotatively engaged with a ring gear of said cutting head and having at least one drive shaft;
    a motor to rotate said drive shaft;
    at least one battery to power said motor;
    a power switch to selectively supply power to said motor to initiate and terminate the operation thereof; and
  e) said drive assembly comprising:
    a primary drive shaft rotatively driven by said motor;
    a primary pinion gear disposed on the distal end of said drive shaft for engagement with said first ring gear of said cutting head;
    a bevel connection shaft perpendicular to a medial portion of said primary drive shaft;
    a primary bevel gear connection in communication with said primary drive shaft and said bevel connection shaft;
    a secondary drive shaft parallel with said primary drive shaft and having an inferior end and a superior end;
    a secondary pinion gear disposed on said superior end of said secondary drive shaft for geared engagement with said second ring gear; and
    a secondary bevel gear connection in communication with said bevel connection shaft and said inferior end of said secondary drive shaft thereby enabling the rotation of said primary drive shaft to transfer the rotative action thereof through said bevel connection shaft to rotate said secondary drive shaft in the opposite direction than said primary drive shaft.

2. An electric pipe-cutting apparatus as recited in claim 1, wherein said battery is rechargeable.

3. An electric pipe-cutting apparatus as recited in claim 1, wherein said cutting head has a first ring gear on one side and a second ring gear on the opposing side.

4. An electric pipe-cutting apparatus as recited in claim 1, wherein said cutting head retaining means comprises at least one fixed cutting head tong extending upward from a top portion of said housing wherein the distal end is curved to conform to the outer circumference of said cutting head and at least one pivoting cutting head tong pivotally connected to a top portion of said housing wherein the distal end is curved to conform to the outer circumference of said cutting head.

5. An electric pipe-cutting apparatus as recited in claim 1, wherein said cutting wheel further includes a cutting wheel axle having a cutting wheel leaf spring disposed within a cutting wheel recess to provide a downward bias against said axle to urge said cutting wheel into said throughbore to provide adequate applied force for cutting said pipe.

6. An electric pipe-cutting apparatus as recited in claim 1, wherein said cutting head further comprises a hinge tension spring to apply a bias to urge the unhinged ends of said cutting ring gear assembly and said support ring gear assembly towards one another to maintain said cutting head in the closed position until a greater opposing force is applied thereto.

7. An electric pipe-cutting apparatus as recited in claim 1, wherein the bias applied by said hinge tension spring is suitably greater than the bias applied by said cutting wheel leaf spring so as to remain closed around said pipe as the retracted cutting wheel is applying pressure to against said pipe.

* * * * *